US008289524B2

(12) United States Patent
Jansen

(10) Patent No.: US 8,289,524 B2
(45) Date of Patent: Oct. 16, 2012

(54) INTERFEROMETER USING POLARIZATION MODULATION

(75) Inventor: Maarten J. Jansen, Casteren (NL)

(73) Assignee: Mitutoyo Corporation, Kawasaki-Shi (JP)

( * ) Notice: Subject to any disclaimer, the term of this patent is extended or adjusted under 35 U.S.C. 154(b) by 426 days.

(21) Appl. No.: 12/458,590

(22) Filed: Jul. 16, 2009

(65) Prior Publication Data

US 2010/0053633 A1 Mar. 4, 2010

(30) Foreign Application Priority Data

Sep. 4, 2008 (EP) ................................ 08163673

(51) Int. Cl.
*G01B 9/02* (2006.01)
(52) U.S. Cl. ........................................ 356/491
(58) Field of Classification Search ........... 356/491, 356/492, 493
See application file for complete search history.

(56) References Cited

U.S. PATENT DOCUMENTS

| 4,881,818 | A | * | 11/1989 | Bustamante et al. | ......... 356/367 |
| 5,764,360 | A | | 6/1998 | Meier | |
| 5,991,033 | A | * | 11/1999 | Henshaw et al. | ............. 356/487 |
| 6,856,401 | B1 | * | 2/2005 | Rønnekleiv | ................. 356/477 |
| 7,016,048 | B2 | * | 3/2006 | Chen et al. | .................. 356/497 |
| 7,675,628 | B2 | * | 3/2010 | Millerd et al. | ................ 356/492 |
| 2003/0220749 | A1 | | 11/2003 | Chen et al. | |
| 2005/0046864 | A1 | | 3/2005 | Millerd et al. | |
| 2005/0046865 | A1 | | 3/2005 | Brock et al. | |
| 2006/0146340 | A1 | | 7/2006 | Szwaykowski et al. | |
| 2007/0109554 | A1 | | 5/2007 | Feldchtein et al. | |
| 2008/0062428 | A1 | * | 3/2008 | Millerd et al. | ................ 356/492 |

OTHER PUBLICATIONS

Kimbrough et al., "Low Coherence Vibration Insensitive Fizeau Interferometer", *Proceedings of SPIE—the International Society for Optical Engineering—Interferometry XIII: Techniques and Analysis* 2006, vol. 6292, pp. 62920F-1-62920F-12.
Jansen, "4.2: Instantaneous Phase Shifting Interferometer Concept", *Development of a Wafer Geometry Measuring System*, 2006, Eindhoven, Eindhoven, pp. 91-106.

* cited by examiner

*Primary Examiner* — Tarifur Chowdhury
*Assistant Examiner* — Jonathan Hansen
(74) *Attorney, Agent, or Firm* — Oliff & Berridge, PLC

(57) ABSTRACT

An interferometer includes a light source, adapted to generate a coherent light beam, a detector adapted to analyze the phase difference of optical light beams, a location unit for locating an object to be measured, a first optical path from the light source to the object and a second optical path from the object to the detector. The first and the second optical path have a common section adjacent to the object. An optical polarization modulator has been arranged in the first path.

11 Claims, 5 Drawing Sheets

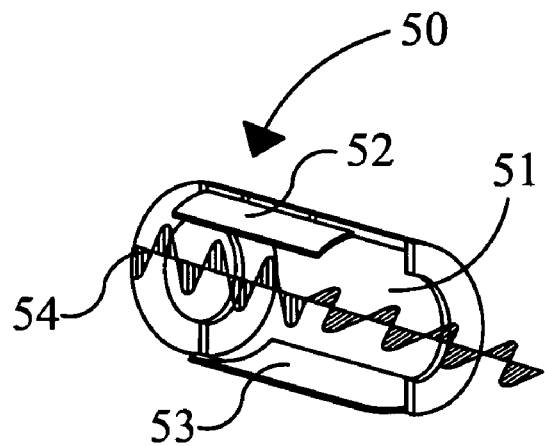 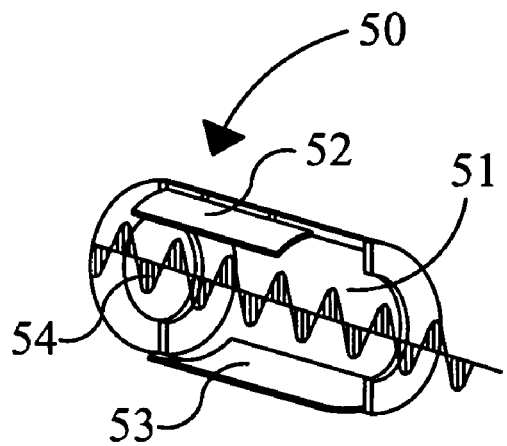
FIG. 5A   FIG. 5B
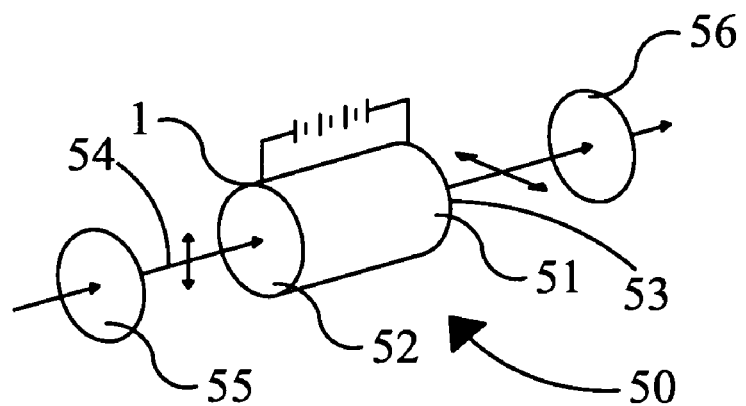
FIG. 6

INTERFEROMETER USING POLARIZATION MODULATION

The present invention relates to an interferometer. Generally interferometers are based on phase differences between two beams, wherein one of the beams is a reference beam and the other beam has been subjected to phase differences by objects to be measured. These phase differences lead to a so called interference pattern which can be analyzed to derive properties of the object to be measured.

BACKGROUND

To enhance the contrast of the interference pattern and hence to allow a more accurate and faster analysis, it is attractive when the reference beam and the measuring beam have an opposite polarization. From the thesis "Development of a wafer geometry measuring system" by M. Jansen, Eindhoven, 2006, an interferometer is known, comprising a light source, adapted to generate a coherent light beam, a detector adapted to analyze the phase difference of optical light beams, location means for locating an object to be measured, a first optical path from the light source to the object and a second optical path from the object to the detector, wherein the first and the second optical path have a common section adjacent to the object.

This prior art interferometer requires the use of polarizing and non-polarizing beam splitters and a quarter wave plate. These are complicated, bulky and expensive parts, which are difficult to adjust. Further the newly proposed concept can use a coherent light source and the obtained interference fringes will have a better contrast. Compared to FIG. 4.26c of this prior art document, the advantage in the newly proposed concept is found in the fact that the reference plane does not require to be tilted relative to the tested object.

Just like any other polarization encoded dynamic interferometer, the newly proposed interferometer also requires a phase analyzer which may consists of either the principle of FIG. 4.24a of this prior art document, using polarizing and non polarizing cube beam splitters, FIG. 4.24b of this prior art document or a phase analyzer as described in patent US-A-2005/0046864. All of these designs require a quarter waveplate at 45° relative to the polarization axis of the reference beam, to be positioned in front of the phase analyser. The waveplate is required to convert the orthogonally polarized reference and test beam into two counterrotating circularly polarized beams such that the beams can be made to interfere by passing it through a analysing polarizer as described in FIG. 4.22 of the thesis. A phase shift can then be introduced by changing the orientation of the analysing polarizer.

The document US-A-2006/0146340 could also be used as a prior art document as it discloses roughly the same contents as the thesis in relation to the present invention.

SUMMARY

The aim of the invention is to provide such an interferometer wherein these disadvantages are avoided. This aim is reached in that in the first optical path an optical polarization modulator has been arranged. These optical modulators are of an easier construction and allow much more flexibility.

These advantages are also reached by a method for measuring properties of an object to be measured wherein the object to be measured is adapted to reflect impinging light beams, the method comprising the steps of generating a coherent light beam directed to the object to be measured, detecting the light beams reflected by the object to be measured and analyze the phase difference of the reflected light beams, wherein the polarization state of the light beam from the light source to the object to be measured is dynamically altered by an optical polarization modulator.

Although these advantages can be reached by interferometers of the types Michelson, Mach-Zehner and other applications of interferometry, the advantages thereof are most prominent when applies in interferometers of the Fizeau type. Hence a preferred embodiment provides an interferometer of the type referred to above, wherein the interferometer comprises a body comprising a reference flat, adapted to both transmit and reflect a part of the light impinging on it and being located in the common section of both optical paths in the vicinity of the object and that the location means are adapted to locate the object to be measured having a measuring plane such that the measuring plane extends substantially parallel to the reference flat.

These advantages are also reached in a corresponding method wherein the light beam from the light source to the object to be measured and the reflected light beam are both directed to a reference flat, adapted to both transmit and reflect a part of the light impinging on it and located in the vicinity of the object to be measured and extending substantially parallel to a plane of the object to be measured.

According to a preferred embodiment, the optical polarization modulator has been arranged in the common section of the first and the second optical paths and that the distance between the reference flat and the object to be measured is equal to an integer multiple times the ¼ of the modulation period distance, being the light speed divided by the modulation frequency of the optical polarization modulator. The advantage of this embodiment is that only one polarization modulator is present and that the control thereof is relatively simple.

Preferably the distance between the optical polarization modulator and the reference plane is equal to an integer multiple times $¼^{th}$ of the modulation period distance, wherein the modulation period distance is the light speed divided by the modulation frequency of the optical polarization modulator. Herein "d" is the minimum preferred distance between the reference plane and the measuring plane, equal to $¼^{th}$ of a modulation cycle length. A cycle length=(speed of light)×(cycle period). The actual distance between the reference plane and the measuring plane may also be chosen to be multiples of "d".

It is however also possible to allow more freedom in the dimensioning of the apparatus by the feature that a first optical polarization modulator has been arranged in the non common section of the first optical path and that a second optical polarization modulator has been arranged in the non common section of the second optical path, that the modulating frequency of the first optical polarization modulator is equal to that of the second optical polarization modulator.

In this configuration it is attractive when the sum of the distance between the first optical polarization modulator and the reference plane and the distance between the reference plane and the second optical polarization modulator is a multiple integer of the minimum distance "d" between the reference plane and the measuring plane. Indeed this feature allows the beams hitting the phase analyzer detector to have a constant polarization. Herein the expression "detector" typically means "polarization sensitive detector arrays" or "phase analyzer module" which is able to determine the phase difference between two orthogonally polarized beams.

Although a number of optical polarization modulators are available, it has appeared that the use of a so called 'Pockels cell' has significant advantages; like the lack of moving parts, a small volume and a low energy consumption.

According to an alternative embodiment, the optical polarization modulator has been arranged in the non common section of the second optical path, that in the non common section of the first part a shutter has been arranged and that the modulation frequency of the optical polarization modulator is equal to the light speed divided by the distance between the reference flat and the object to be measured and that the frequency of the shutter is equal to that of the optical polarization modulator or an integer multiple of this value. In the preceding embodiments both beams impinging the detector have a constant polarization. In the present embodiment this is not the case. Herein the pulsed beam from the light source, which is preferably formed by a laser, just as in any other embodiment, is reflected by both the reference flat and by the measuring plane, so that both the measurement beam and the reference beam comprise pulsed signals, wherein the measurement beam is delayed in time relative to the reference beam. The non reflected beam was already subjected to controlled polarization or rather polarization modulation so that the pulsed reflected signals are also polarized and the overlapping parts of the measurement signal and the reference signal have an orthogonal polarization. Only these overlapping parts of the pulses lead to a detectable phase pattern on the detector. It will be clear that a pulsed light source can be achieved by an inherently pulsed source as is common in laser sources but that it is also possible to have a continuous source provided with a shutter, possibly a mechanical shutter but preferably an electronic shutter.

The resolution is further enhanced if the closed duty cycle of shutter is larger than the distance between the reference flat and the object to be measured. This leads to optimum contrast on the detector.

Preferably the shutter and the optical polarization modulator are both formed by a "Pockels cell", leading to the same advantages as mentioned before in relation to the use of such a 'Pockels cell'.

Yet another preferred embodiment provides the feature that the beam is a pulsed beam with a duty cycle smaller than 0.5 and that an optical polarization modulator has been arranged in the first optical path which is adapted to separate the beam from the source in a first beam and a second beam having a mutual orthogonal polarization, that the means are arranged in the first path to delay the second beam relative to the first beam. Herein the pulsed beam is conducted through a delay circuit which could be formed by the so called porro-prism configuration, resulting in two beams having a mutual time delay and an orthogonal polarization. The thus obtained pulsed light beams are reflected by either the reference flat or the measurement object, resulting in light beams having an amended time lag. Of course delay means of other kinds could be used as well. However, just as in the preceding case, the overlap between beam parts having an orthogonal polarization causes a discernible phase pattern on the detector. An additional shutter may be used in front of the detector to improve fringe contrast by blocking parts of the beams that do not contribute to the interfering of the reference beam and the measurement beam.

Also in this embodiment the source can be formed by a shutter, preferably a 'Pockels cell' or a light source inherently adapted to generate a pulsed light beam.

BRIEF DESCRIPTION OF THE DRAWINGS

Subsequently the present invention will be elucidated with the help of the accompanying figures, depicting:

FIG. 5A: a perspective diagram showing a 'Pockels cell';

FIG. 5B: a perspective diagram showing a 'Pockels cell' in another situation; and FIG. 6: a perspective diagram showing a 'Pockels cell' in yet another situation.

DETAILED DESCRIPTION

Figure 1:
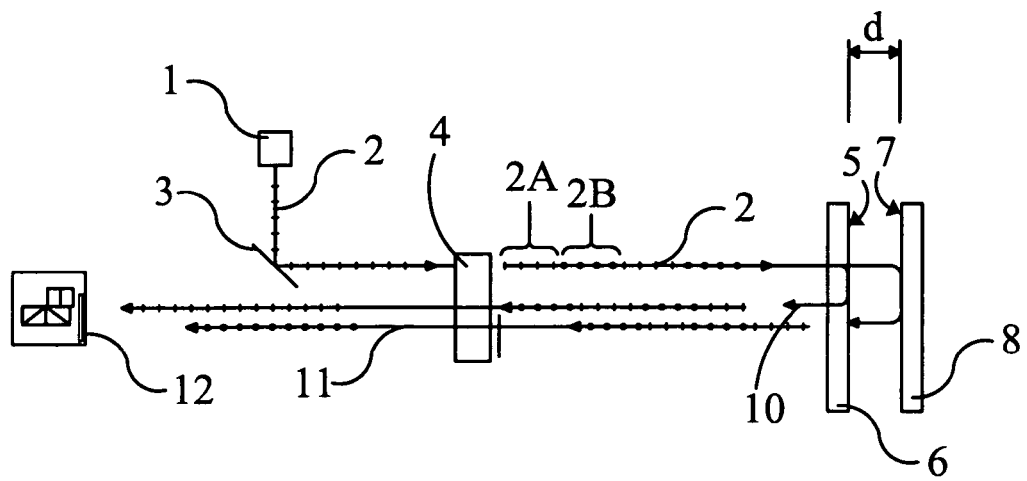
FIG. 1: a diagram showing a first embodiment of the present invention.

The interferometer of which the diagram is depicted in FIG. 1 is an interferometer of the Fizeau type, wherein a beam is reflected against a face of the object to be measured and a reference flat, and wherein both reflected beams are combined on a detector to obtain an interference image. It will be clear that the principle of the present invention can also be applied to interferometers having other configurations that that of the Fizeau interferometer.

The interferometer according to the invention comprises a light source 1, adapted to generate a coherent light beam 2, which is directed to a mirror 3, the mirror 3 is a semi transparent mirror. Due to the fact that the mirror 3 is located in the optical axis of the interferometer, the light beam 2 reflected by the mirror 3 is in the optical axis. In the optical axis further a so called Pockels cell 4 is located which is adapted to modulate the coherent light beam. It is noted that instead of a Pockels cell other polarization modulators can be used. The beam 2 emerging from the reference Pockels cell 4 is directed to a reference flat 5 of a reference body 6, which lets a part of the beam through to the measurement plane 7 extending substantially parallel to the reference flat 5 of the object 8 to be measured.

Herein the distance between the measurement plane 7 and the reference flat 5 is distance d, or multiples of this. The beam 2 let through by the reference body 6 is reflected by the measurement plane 7 and is again let trough by the reference body 6. Thus two beams emerge from the reference body 6, that is a reference beam 10, reflected by the reference flat 5 and the measurement beam 11 reflected by the measurement plane 7 and both beam travel in the optical axis. Both beams 10, 11 travel through the Pockels cell 4 again and through the mirror 3, until they reach a detector 12.

As stated before, the beam 2 emerging from the light source is a coherent light beam, which is subjected to polarity modulation in the Pockels cell 4. Consequently, the beam emerging from the Pockels cell 4 comprises section 2A with a first polarization direction indicated by stripes in the figure and section 2B with a second polarization direction orthogonal to the first polarization direction and indicated by blobs in the figure. The duty cycle of the Pockels cell 4 is chosen such that length of the sections 2A and 2B is equal. Further the frequency of the Pockels cell is such that the length of the sections 2A, 2B is also equal to twice the minimum required distance d between the measurement plane 7 and the reference flat 5. This implies that the reflected beams 10, 11 have an orthogonal polarization, as the path of the measurement beam 11 is the length of one section longer than that of the reference beam 10. Both reflected beams 10, 11 are guided through the Pockels cell 4 again on their way back to the mirror. In the Pockels cell 4 the beams 10, 111 are both subjected to a modulation of the polarity so that both beams 10, 11 emerging from the Pockels cell 4 that also use a matrix array of phase quadrature phase analyzers to detect wavefront differences between two orthogonally polarized beams.

This is caused by the fact that the modulation frequency is the same as during the modulation of the beam 2 and that the distance between the reference flat 5 and the Pockels cell 4 is an integer multiple of the section d. These two beams 10, 11 having an orthogonal polarization so that the comparison between the two beams can be executed by a phase analysis, just as in prior art methods that also use a matrix array of phase quadrature phase analyzers to detect wavefront differences between two orthogonally polarized beams.

Figure 2:
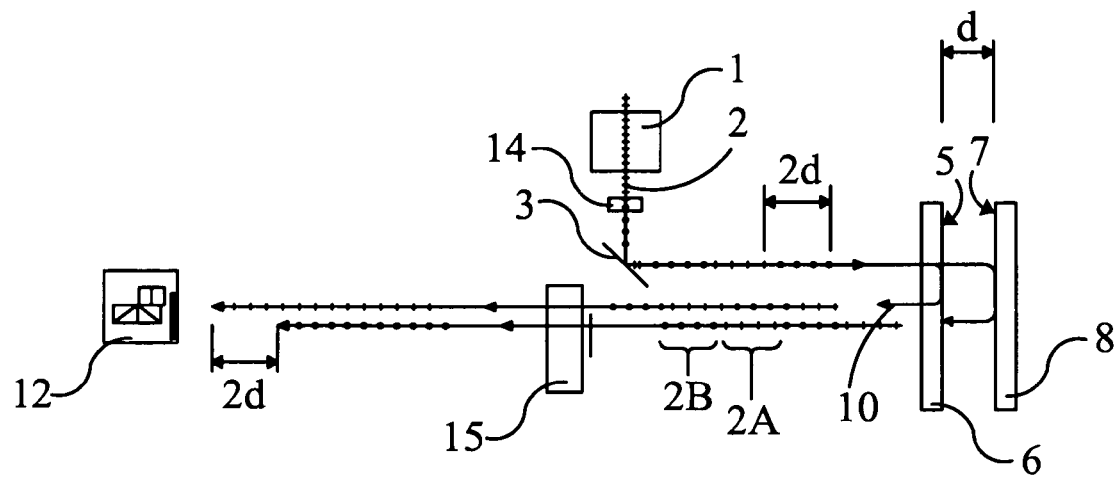
FIG. 2: a diagram showing a second embodiment of the present invention.

FIG. 2 depict a similar embodiment wherein two Pockels cells are used instead of a single one as in the preceding embodiment. Herein a first Pockels cell 14 is located between the light source 1 and the mirror 4, that is in the first path between the light source 1 and the object 8 to be measured. The second Pockels cell 15 is located in the optical axis between the mirror 4 and the phase analyzer 12, that is in the second path between the object to be measured 8 and the phase analyzer 12. Thus the Pockels cells 14, 15 are located in the non common parts of the first and second paths.

Just as in the preceding embodiment the duty cycle of the first Pockels cell 14 is 50%, its frequency is adapted so that the length of the alternate sections 2a, 2b is each equal to twice the distance between the reference flat 5 and the measuring plane 7. The duty cycle of the second Pockels cell 15 is also 50% and its frequency is equal to that of the first Pockels cell 14. The further functioning of the interferometer is the same as that of the interferometer as described in the first embodiment.

However the provision of two separate Pockels cells 14, 15 or polarizing modulators allows not only to locate them on different distances from the reference flat 5 but also to have a phase difference of their modulation frequencies. Herein said phase difference is adapted to the sum of the distances between the first Pockels cell 14 and the reference flat 5 and between the reference flat 5 and the second Pockels cell 15. This adjustment allows to have the polarization angle between the reference beam and the measurement beam emerging from the second Pockels cell 15 constant, which is an advantage for the phase analysis to be taken place in the phase analyzer 12.

Figure 3A:
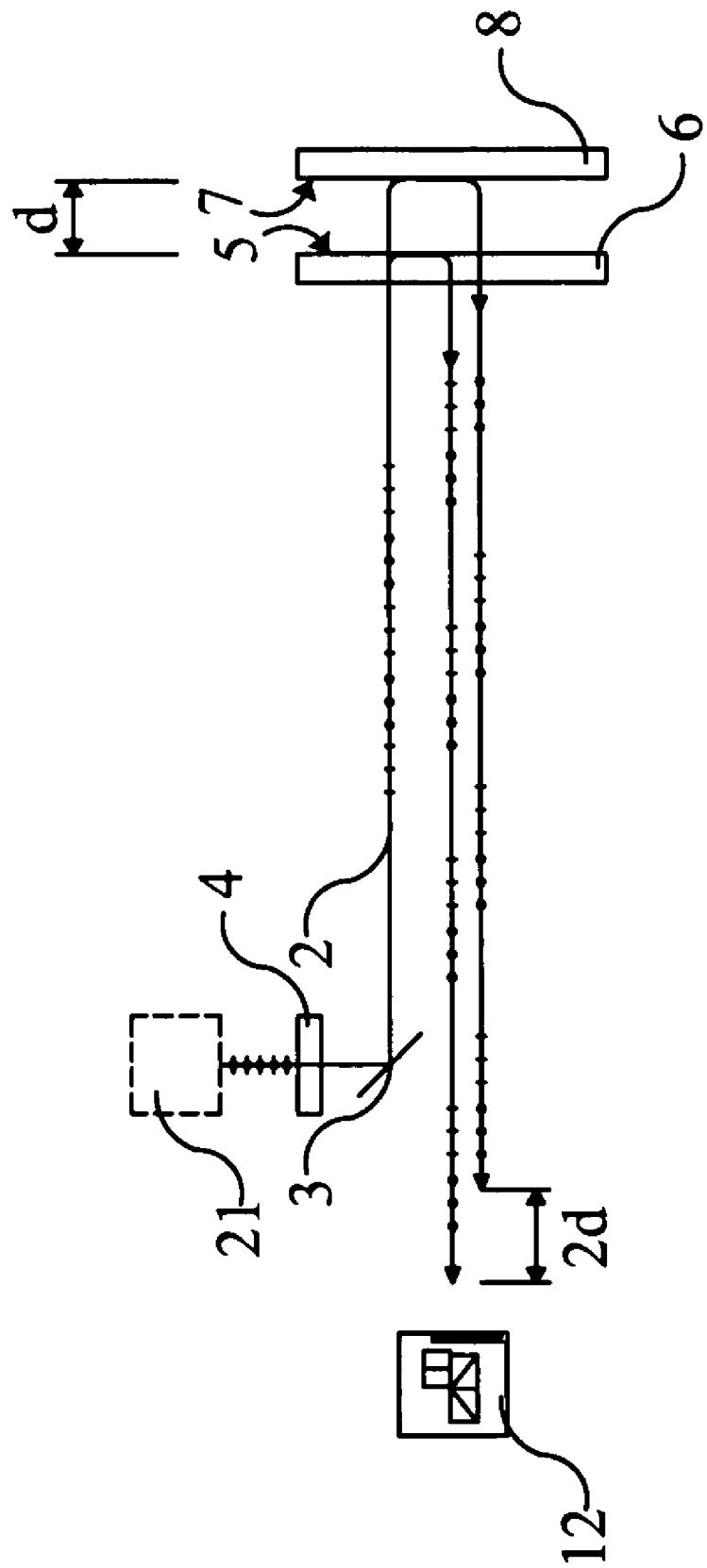
FIG. 3A: a diagram showing a third embodiment of the present invention.

In a third embodiment, depicted in FIG. 3A substantially the same configuration is used as in FIG. 2, although only one Pockels cell 4 or polarization modulator is present in the non common section of the path between the light source 21 and the reference flat 5 just as in the first embodiment. Further the light source 21 is adapted to generate a light beam which is not only coherent but also pulsed. The beam 2 emerging from the light source is thus a pulsed light beam having 'dark' sections wherein no light is emitted and 'light' sections. The 'light' sections are modulated in the Pockels cell 4, so that the 'light' sections contain sections having a first polarization and sections having a second polarization orthogonal to the first polarization. This implies that the frequency of both the pulses of the light source and the polarization of the Pockels cell are equal. Subsequently the thus modulated light beam is further guided to the mirror 3, the reference flat 5 and the measuring plane 7 and reflected by those surfaces, wherein the difference in distance leads to a phase difference in time.

Consequently the phase analyzer 12 is hit by a measuring beam 10 and a reference beam 11 shifted in time and both having different polarized portions. This implies that when—again—the frequency of the Pockels cell is chosen so that the distance between the measurement plane and the reference flat is the half of the length of a section modulated in either polarization, each combination of two light sections of the measurement beam and the reference beam have a part wherein two orthogonal polarized sections are present. These allow the phase analyzer to perform a phase analysis. Herein the light sections of the beams cause some additional background illumination, reducing the fringe contrast.

The advantage of this embodiment is the presence of a single Pockels cell, albeit together with a pulsed light source. It is however also possible to use a continuous light source with a shutter to generate the pulsed light beam, wherein the shutter can be formed of a Pockels cell, combined with polarizing filters.

Figure 3B:
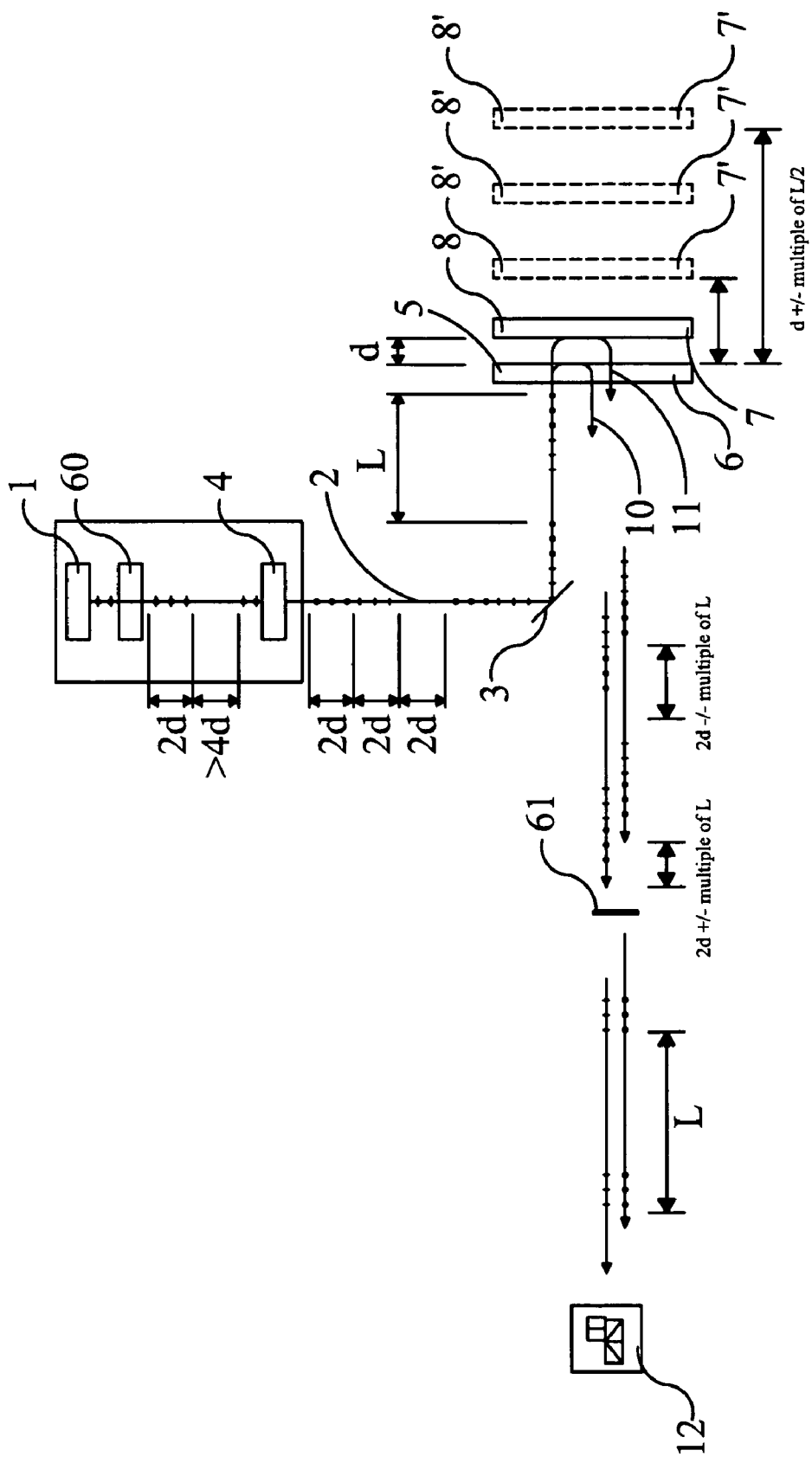
FIG. 3B: a diagram showing a variation of the third embodiment.

The embodiment depicted in FIG. 3B is elaboration of the embodiment depicted in FIG. 3A. More in particular the system depicted in FIG. 3B comprises a high frequency shutter 60 which may be formed by the Pockels cell in combination with a polarizing filter. It is however also possible that a mechanical shutter is used. This shutter is adapted to have duty cycle wherein the dark phase is at least as long as the bright phase, and more preferably the dark phase is at least twice as long as the bright phase. Especially the last relation facilitates a beam leaving the polarization delay generator 4 having a first part with a first polarization, a second part with equal length of the first part having a polarization orthogonal to that of the first polarization and a third part wherein no light is present. Although this last 'dark' part may be as long as the first and second parts, it is preferable when it is longer than those parts.

The length of the first and second parts (2d) is preferably equal to twice the minimum distance (d) between the reference flat and the measurement plane. Consequently the total pulse period (L) is preferably equal to at least six times the minimum distance (d) between the reference flat and the measurement object.

It also appears from FIG. 3B that it is possible to locate the object to be measured on a distance from the reference flat which is larger than d, that is plus or minus a multiple of L/2.

Finally this embodiment comprises a shutter 61 located between the mirror 3 and the detector or phase analyzer, which opens only when the measurement beam and the reference beam have coinciding orthogonal phases, thus avoiding situation wherein only on of the beams is present and fringe lighting on the detector develops. However this shutter is not required for the functioning of this embodiment; it only serves to avoid fringe lighting on the detector 12.

It will be clear that these extra features can also be applied to other embodiments of this invention where they are applicable.

Figure 4:
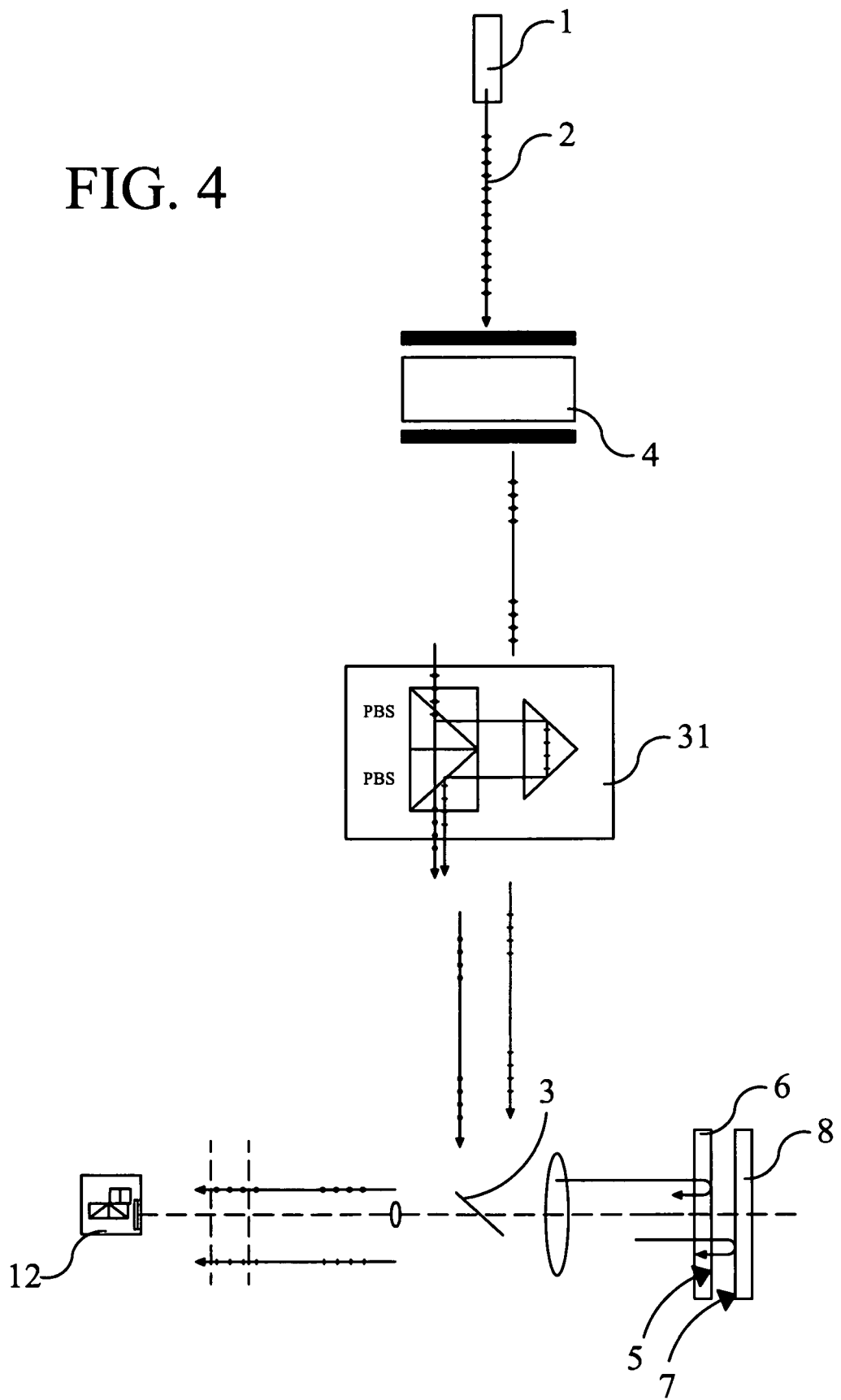
FIG. 4: a diagram showing a fourth embodiment of the present invention.

FIG. 4 shows another embodiment wherein modulation of the beam is achieved differently. Again this interferometer comprises a coherent light source 1, preferably a laser, followed by a shutter 4, which can be formed by a Pockels cell combined with two polarizing filters. In so far this embodiment equals that of the preceding embodiment. Subsequently a delay unit 31 for generating a time delay between two orthogonally polarized beams is passed, which splits the beam 2 from the light source 1 in two orthogonally polarized beams, and which deflects one thereof to a path deviating from a straight line and which combines the two orthogonally polarized beams, wherein one thereof is delayed over a certain time, being equivalent to a delay path length of the delay unit 31. Delay units of this kind belong to the prior art. They are known are porro-prism delay units. These are described in inter alia the doctors thesis by M. Jansen referred to above.

Instead thereof units with different configurations can be used as for instance those of the Twyman-Green configuration.

Just as in the preceding embodiments the combined beam is reflected by the mirror 3 after which the reflected beam is directed to the reference body 6 with the reference flat 5 and the measurement object 8 with the measurement plane 7. The combined measurement beam and reference beam are directed to the phase analyzer 12.

It is important that the delay or extra path length of the unit 31 is equal to twice the minimum distance "d" between the reference flat 5 and the measurement plane 7. It is noted that the distance between reference flat and measurement plane may also be approximately equal to multiples of "d". This implies that the combination of the reference beam and measurement beam have a section wherein the reference beam and measurement beam are orthogonally polarized. This section of the combined light beam can be analyzed by the phase analyzer 12. Herein it is noted that the combined beam also comprises sections wherein either the reference beam or the measurement beam are present, while the other beam is dark. These sections only cause some additional background illumination, reducing the fringe contrast.

FIGS. 5A and 5B depict a so called Pockels cell. A Pockels cell is an electro-optic modulator comprising an anisotropic crystal having the property to rotate the polarization of the light beam traveling through the cell under the influence of an electric field applied to the crystal. FIG. 5A shows a Pockels cell indicated in its whole by 50, and comprising an anistropic crystal 51 having the properties referred to above. At its upper surface and at its lower surface an electrode 52, 53 respectively is located, which are connectable to an electric generator. When a voltage is applied to the electrodes 52, 53, an electric field develops in the crystal 51, which causes a light beam 54 travelling through the crystal 51 to change its polarization angle as appears from FIG. 5A. When however no voltage is applied to the electrodes the light beam travels through the crystal without any change to the polarization angle as is depicted in FIG. 5B.

Finally FIG. 6 shows a Pockels cell 50, in combination with two polarizing filters 55, 56 located on either side of the cell, and having orthogonal polarization directions. This implies that when no voltage is applied to the electrodes 52, 53 of the Pockels cell 50, the light beam is affected by the first polarizing filter 55, so that only polarized light remains the light beam traveling trough the Pockels cell, but that the polarized light is blackened out by the second orthogonal polarizing filter. When however voltage is applied between the electrodes 52, 53, the electric field thus generated in the crystal will rotate the polarization angle of the light bema traveling through the crystal so that it will be passed by the second polarizing filter. This offers the possibility to use the Pockels cell as a shutter or light switch.

It will be clear that numerous variations can be applied in the embodiments described above without deviating from the scope of the invention as defined in the accompanying claims. Further it will be clear that features of the different embodiments can be mutually exchanged and combined within the scope of the invention.

The invention claimed is:

1. An interferometer, comprising:
a light source, adapted to generate a coherent light beam;
a body comprising a reference flat, adapted to both transmit a part of the coherent light beam as a measurement light beam and reflect another part of the coherent light beam as a reference beam;
location means for locating an object to be measured having a measuring plane such that the measuring plane extends substantially parallel to the reference flat;
a detector adapted to analyze a phase difference of the reference light beam and the measurement light beam;
a first optical path from the light source to the object;
a second optical path from the object to the detector, the first and the second optical paths have a common section in which the reference flat is located; and
a first optical polarization modulator arranged in the first optical path and having a modulation frequency,
wherein a distance between the reference flat and the object to be measured is equal to an integer multiple times $\frac{1}{4}^{th}$ a modulation period distance, the modulation period distance being light speed divided by the modulation frequency of the first optical polarization modulator.

2. Interferometer as claimed in claim 1, wherein
the first optical polarization modulator has been arranged in the common section of the first and the second optical paths, and
a distance between the reference flat and the first optical polarization modulator is equal to an integer multiple times $\frac{1}{4}^{th}$ of the modulation period distance.

3. Interferometer as claimed in claim 1, wherein
the first optical polarization modulator has been arranged in a non-common section of the first optical path,
a second optical polarization modulator has been arranged in a non-common section of the second optical path,
the modulation frequency of the first optical polarization modulator is equal to that of the second optical polarization modulator, and
a phase difference between the first and second optical polarization modulators is a function of a sum of a distance between the first optical polarization modulator and the reference plane and a distance between the reference plane and the second optical polarization modulator.

4. Interferometer as claimed in claim 3, wherein at least one polarization modulator is formed by a Pockels cell.

5. Interferometer as claimed in claim 1, wherein
the first optical polarization modulator has been arranged in a non-common section of the second optical path,
in the non common section, a shutter has been arranged,
the modulation frequency of the first optical polarization modulator is equal to the light speed divided by the distance between the reference flat and the object to be measured, and
a frequency of the shutter is equal to that of the first optical polarization modulator or an integer multiple of this value.

6. Interferometer as claimed in claim 5, wherein a closed duty cycle of the shutter is equal to or larger than twice an open duty cycle of the shutter.

7. Interferometer as claimed in claim 5, wherein the shutter is formed by a Pockels cell.

8. Interferometer as claimed in claim 1, wherein
the coherent light beam is a pulsed beam with a duty cycle smaller than 0.5,
the first optical polarization modulator is adapted to separate the coherent light beam from the light source in a first beam and a second beam having a mutual orthogonal polarization, and
the location means are arranged in the first path to delay the second beam relative to the first beam.

9. Interferometer as claimed in claim 8, wherein
the light source is adapted to generate a continuous light beam, and
a shutter is arranged in the first optical path.

10. Method for measuring properties of an object to be measured wherein the object to be measured is adapted to reflect impinging light beams, the method comprising:
generating a coherent light beam directed to the object to be measured;
splitting the coherent light beam into a reference beam and a measurement beam;

directing the measurement beam to the object to be measured;
directing the reference beam to a reference flat;
uniting the reference beam and the measurement beam; and
analyzing a phase difference between the reference beam and the measurement beam; wherein
the light beam from the light source to the object to be measured is polarized by an optical polarization modulator,
a distance between the reference flat and the object to be measured is equal to an integer multiple times $\frac{1}{4}^{th}$ a modulation period distance, the modulation period distance being light speed divided by a modulation frequency of the optical polarization modulator.

11. Method as claimed in claim 10, wherein the light beam is polarized by a Pockels cell.

* * * * *